(No Model.)
C. FREY.
SIPHON.
No. 273,058. Patented Feb. 27, 1883.
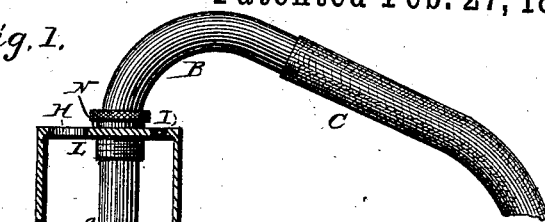
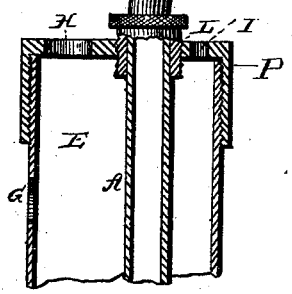
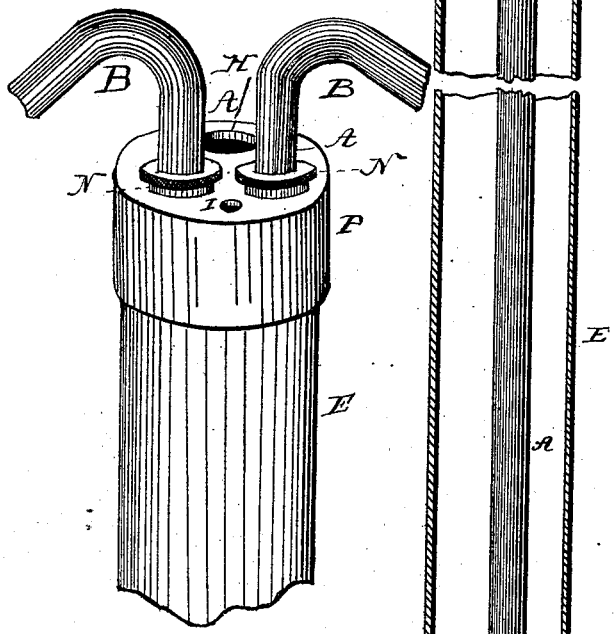
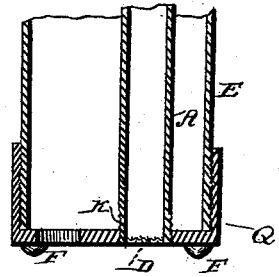
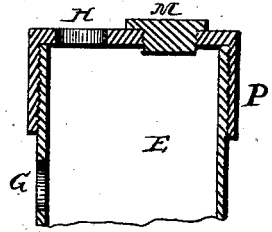
WITNESSES:
Charles Frey
INVENTOR,
by Louis Bagger & Co.
ATTORNEYS.

UNITED STATES PATENT OFFICE.

CHARLES FREY, OF BALTIMORE, MARYLAND.

SIPHON.

SPECIFICATION forming part of Letters Patent No. 273,058, dated February 27, 1883.

Application filed October 16, 1882. (No model.)

*To all whom it may concern:*

Be it known that I, CHARLES FREY, of Baltimore, in the county of Baltimore and State of Maryland, have invented certain new and useful Improvements in Beer-Siphons; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal sectional view of my improved siphon. Fig. 2 is a similar view of the top of the device, showing a slight modification. Fig. 3 is a like view of the lower part of the device modified; Fig. 4, a similar view with a tube removed; and Fig. 5 is a perspective view of the upper part of the device.

Similar letters of reference indicate corresponding parts in all the figures.

My invention has relation to siphons for drawing liquids from one vessel into another; and it consists in the improved construction of parts of the same, as will be hereinafter more fully described and claimed.

In the accompanying drawings, the letter A indicates a metallic tube, bent at its upper end, B, of which there may be two or more, as desired. Over the bent ends B of these tubes are drawn the ends of rubber tubes C, which may be of any desired length, while at the lower ends of the tubes A are strainers D, of wire-cloth or other suitable material. The tubes A are inclosed in a cylindrical casing, E, closed at both ends, by either having the top N and bottom O soldered to the casing, or, as shown in Figs. 2, 3, and 4, by having screw-threaded caps P and Q, which are screwed over the two ends of the casing, making the cleaning of the device easier. The lower ends of the tubes are screw-threaded, as shown at K, and fit into screw-threaded holes in the bottom of the casing, while they are provided with screw-threaded sleeves L at the point where they enter the casing through the top, said sleeves fitting close on the tubes and turning on them, while they work in screw-threads in the top of the casing. The bottom of the casing is provided with small knobs or feet F, which raise the apparatus sufficiently high from the bottom of the vessel it stands in to admit the liquid to the siphon-tubes A, and at the same time permit the ends of said tubes to be close enough to the bottom of the vessel to draw substantially all the contents out.

The device is chiefly intended for drawing off spirituous and fermented liquors contained in casks or barrels, and is inserted through the bung-hole and stands on the inside of the swell of the cask. In this manner the casing will fill the bung-hole nearly or entirely.

For the purpose of admitting sufficient air to act on the surface of the liquid, the casing is provided with an air-hole, G, in the side, and two or more holes, H and I, in the top, through which the air enters and acts upon the fluid through an opening, J, in the bottom.

The tubes are made removable, so that one or more tubes may be used, as desired, the holes in the top being closed, when their appropriate tubes are removed, by screw-threaded plugs M, as shown in Fig. 4.

Having thus described my invention, I claim and desire to secure by Letters Patent of the United States—

The herein-described siphon, consisting of the metallic tubes A, provided with strainers D at their lower ends, and having their upper bent ends, B, provided with rubber tubes C, and the casing E, having knobs or feet F, air-entrances G, H, and I, lower apertures, J, and screw-threaded apertures at top and bottom for the insertion of the tubes A, substantially as and for the purpose shown and set forth.

In testimony that I claim the foregoing as my own I have hereunto affixed my signature in presence of two witnesses.

CHARLES FREY.

Witnesses:
WILLIAM SECHER,
LOUIS BAGGER.